No. 742,223. PATENTED OCT. 27, 1903.
P. C. PATTERSON.
HOT SAW.
APPLICATION FILED APR. 10, 1902.
NO MODEL. 2 SHEETS—SHEET 1.
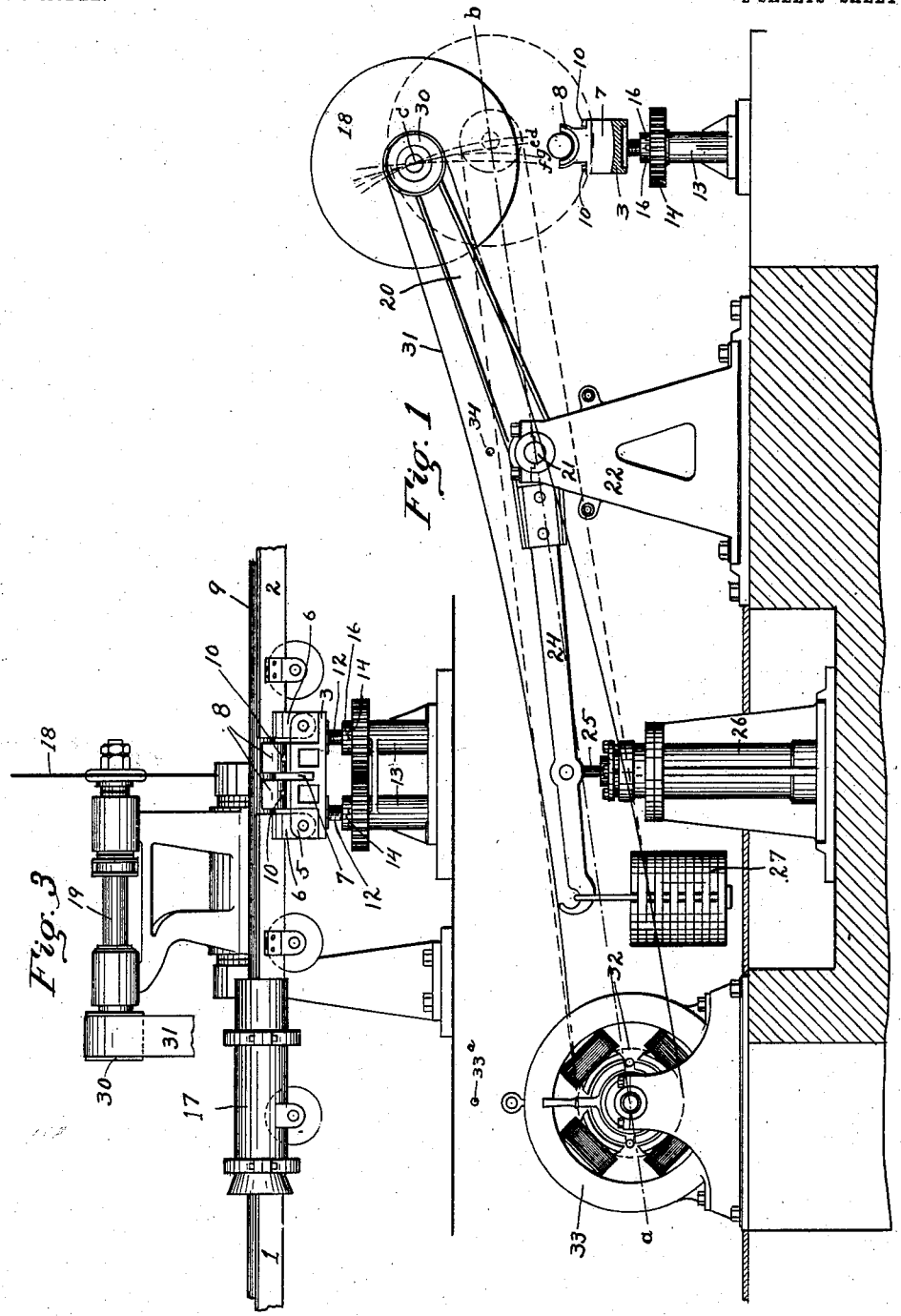
Witnesses.
Fred D. Sweet.
Inventor.
Peter C. Patterson
By Kay & Totten
Attorneys.

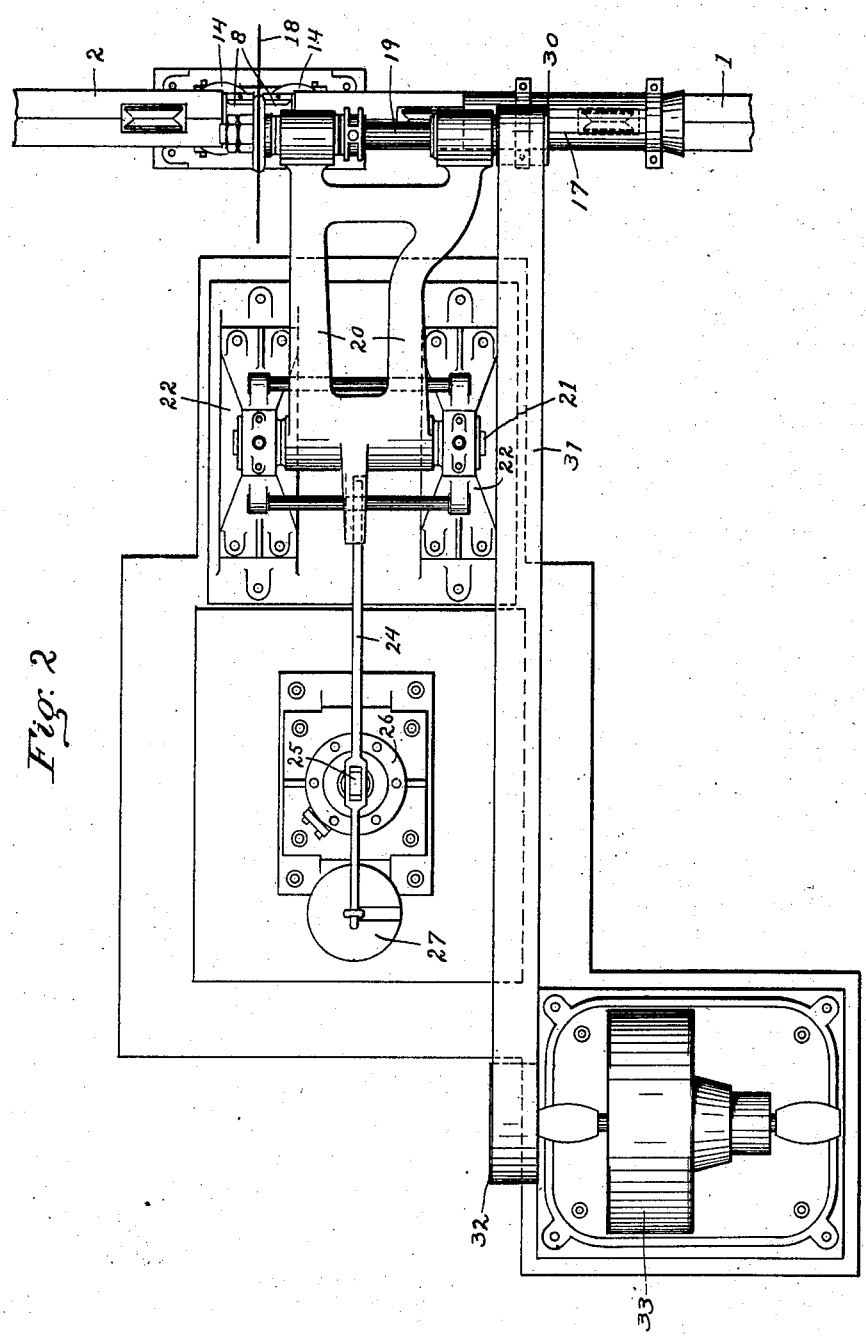

No. 742,223. Patented October 27, 1903.

UNITED STATES PATENT OFFICE.

PETER C. PATTERSON, OF McKEESPORT, PENNSYLVANIA, ASSIGNOR TO NATIONAL TUBE COMPANY, OF PITTSBURG, PENNSYLVANIA, A CORPORATION OF NEW JERSEY.

HOT-SAW.

SPECIFICATION forming part of Letters Patent No. 742,223, dated October 27, 1903.

Application filed April 10, 1902. Serial No. 102,213. (No model.)

*To all whom it may concern:*

Be it known that I, PETER C. PATTERSON, a resident of McKeesport, in the county of Allegheny and State of Pennsylvania, have invented a new and useful Improvement in Hot-Saws; and I do hereby declare the following to be a full, clear, and exact description thereof.

My invention relates to metal-saws, and more especially to hot-saws for severing tubes as they come from the sizing-rolls.

The object of my invention is to provide a metal-saw in which the slipping of the driving-belt or other driving means is entirely or largely prevented and which is adapted to sever tubes or other articles of various sizes.

To these ends my invention consists in mounting the rotary saw in a swinging frame and having the power-driven pulley for imparting motion thereto so located that the distance between its center and the center of the saw-pulley increases as the saw swings to sever the article, this being accomplished in the case of a downwardly-swinging saw by locating the power-driven pulley so that its center will be above or in a line drawn through the centers of the swinging frame and of the saw-pulley in the final active position of the saw.

My invention also consists in providing a support for the tube or other article which is adjustable toward and from the saw and which is provided with removable and interchangeable rests for accommodating tubes or other articles of various sizes.

In the accompanying drawings, Figure 1 is a side elevation of my improved saw, the support being shown in section. Fig. 2 is a plan view of the same, and Fig. 3 is a front view of the saw frame and support.

My saw is primarily intended for severing tubes in the hot state as they come from the sizing-rolls and will preferably be located at some point between the sizing and finishing or cross rolls. The trough 1 comes from the sizing-rolls, and the trough 2 leads to the finishing-rolls, and in this trough is a section 3, which forms the direct support for the tube while being severed. This section 3 comprises a block having at its ends perforated ears 5, between which are pivoted ears 6, projecting downwardly from the ends of the troughs 1 and 2. By these means the section 3 is made practically continuous with the troughs 1 and 2. The block 3 is provided about midway of its length with a transverse kerf or groove 7, into which the saw can pass after severing the tube, and on its upper surface on each side of this kerf are a pair of removable shoes 8, which have concave upper faces to receive the tube 9. In order to accommodate tubes of different sizes, these shoes 8 are removably secured to the block 3, as by means of bolts 10, so that said shoes may be replaced by others having a larger or a smaller convexity.

It frequently becomes necessary to adjust the troughs 1 and 2, due to the wear of the sizing and finishing rolls, and the support 3 must be correspondingly adjusted. Any suitable means for this purpose may be employed, and I have shown a pair of screws 12, secured to the block 3 and extending down into the housings or frames 13. Resting on top of the housings 13 and surrounding the screws 12 are a pair of internally-threaded nuts 14, which are enlarged, as shown, to form, in effect, spur-wheels which intermesh, so that by turning one thereof the other will be correspondingly turned. These nuts are provided with suitable holes 16 for the insertion of a bar, spanner-wrench, or the like for turning the same. By the means described the support can be adjusted up and down as necessary. In the trough 1 in advance of the saw is the usual straightening-nozzle 17.

The saw is shown at 18 and is of the ordinary rotary type, being secured to an arbor 19, mounted in the outer end of a swinging frame 20, which is mounted by trunnions 21 in the housing or frame 22, located at one side of the tube-support. Suitable mechanism will be provided for swinging the frame 20 in order to swing the saw across the path of the tube to sever the same, and I have provided for this purpose the frame 20 with a rearwardly-projecting arm 24 and connect the same to the upper end of a piston-rod 25 of a hydraulic or other power cylinder 26. This cylinder preferably is of the single-acting type and acts to swing the saw across the path of the tube. A suitable counterweight 27 is suspended from the rear end of the arm 24 and serves to return the saw to its original position. This counterweight may be dispensed with if the cylinder 26 is made of the double-acting type, and this part of the mechanism may be further varied within wide limits.

The saw-arbor is provided with a belt-pulley 30, which receives a belt 31, coming from any suitable source of power—such, for instance, as the pulley 32 on the armature-shaft of an electric motor 33. Any other means of driving the pulley 32 may, however, be employed. When the saw comes in contact with the tube or other article to be severed, it meets with much resistance, which has a tendency to cause the driving-belt to slip, and in metal-saws as ordinarily constructed one of the difficulties is to get sufficient power to prevent the slowing down of the saw while severing the hot article. Usually this difficulty is overcome by providing a driving-belt much wider and heavier than is required by the mere work of cutting the article. I overcome this difficulty by so locating the power-driven pulley 32 with reference to the saw-pulley 30 that as the saw is swung downward to its active position the belt 31 is tightened, thus preventing slipping. I have shown the driving-pulley 32 located a considerable distance beyond the pivotal point 21 of the swinging frame 20, so that while the saw swings in the arc of a small circle the belt, in effect, becomes the radius of a very much larger circle. Preferably the driving-pulley 32 will be so located that its center will be in a line drawn through the centers of the swinging frame 20 and of the saw-pulley when the saw is in its final active position, so that in this position of the saw the radius formed by the swinging frame 20 is practically coincident with the radius formed by the belt and the latter will be stretched very tight. This line is indicated by $a\,b$ on Fig. 1, while $c\,d$ indicate the arc struck about the center of the swinging frame 20, and $c\,e$ indicate the arc struck about the center of the power-driven pulley 32. These arcs are shown as crossing at the center of the saw-pulley when in its inactive position, and it is seen that the arc $c\,e$ is inside of the arc $c\,d$ at the active position of the saw, so that the belt is tightened as the saw passes from the inactive to the active position.

It is not necessary that the center of the pulley 32 be in the line $a\,b$, as it may be above the same and secure the same result. For instance, if it were located at $33^a$ the arc struck about it and through the center $c$ is indicated by the line $c\,f$ and is inside the arc $c\,e$, so that the belt will be tightened to even a greater extent than when the center of the pulley 32 is in the line $a\,b$. Neither is it essential that the pulley 32 be located beyond the center of the swinging frame. For instance, if it were located at 34 the arc struck about its center and through the center $c$ would be indicated by the line $c\,g$, and as this is within the arc $c\,d$ the belt will be tightened as the saw swings to its active position. In all cases, however, the center of the pulley 32 is in or above the line $a\,b$ and must never be below said line. The terms "above" and "below" are used only in a relative sense and are intended to designate absolute positions only when the saw is mounted to swing downwardly, as shown in the drawings. By any of the arrangements described the belt will be tightened as the saw descends, and when it is elevated to the position shown in full lines, Fig. 1, the belt will become somewhat slack and will not be under strain while the saw is idle. In this way stretching of the belt is largely avoided, and at the same time when the strain is upon the saw the belt will have become tight and slipping will be prevented.

In the use of my invention the tube coming from the sizing-rolls will pass onto the shoes 8, and the latter will have been adjusted to the necessary height to bring them in line with the troughs 1 and 2, and shoes 8 of the right size to accommodate the tube will have been secured to the support. At the proper time power will be admitted to the cylinder 26, thus pushing up on the piston-rod and swinging the frame 20 downward to carry the saw 18 across the path of the tube, severing the same and passing down into the kerf 7 of the support. As the saw swings downward the belt 31 is gradually tightened, and by the time the saw reaches its lowest active position the belt will practically have reached its maximum tightness. The slipping of the belt is prevented, and the saw is driven through the tube without loss of speed or power. As soon as the tube is severed pressure in the cylinder 26 will be released, when the counterweight 27 will swing the frame 20 upward, carrying the saw to its idle position and permitting the belt 31 to run slack.

While I have described my saw as particularly adapted for severing hot tubes, I wish it understood that it is not limited thereto, but that it can be used for severing metal articles of any kind or description.

What I claim as my invention, and desire to secure by Letters Patent, is—

1. In a metal-saw, the combination with a support for the article, a swinging frame, a rotary saw mounted therein in position to swing across the support, a driving-pulley for the saw-arbor, a belt, and a power-driven pulley mounted on a center separate from that about which the saw-frame swings and so located that the distance between its center and the center of the saw-pulley increases as the saw swings to its final active position.

2. In a metal-saw, the combination with a support for the article, a swinging frame, a rotary saw mounted therein in position to swing across the support, a driving-pulley for the saw-arbor, a belt, and a power-driven pulley so located that its center is above or in a line drawn through the centers of the swinging frame and of the saw-pulley in the final active position of the saw.

3. In a metal-saw, the combination with a support for the article, a swinging frame at one side thereof, a rotary saw mounted therein in position to swing across the support, a driving-pulley for the saw-arbor, a belt, and a power-driven pulley beyond the center of the swinging frame and so located that its center is above or in a line drawn through the centers of the swinging frame and of the saw-pulley in the final active position of the saw.

4. In a metal-saw, the combination with a support for the article, a swinging frame at the side of said support, a rearwardly-projecting arm on said frame, a power-cylinder and counterweight connected to said arm, a rotary saw mounted in said frame in position to swing across the support, a driving-pulley for the saw-arbor, a belt, and a power-driven pulley so located that its center is above or in a line drawn through the centers of the swinging frame and of the saw-pulley in the final active position of the saw.

5. In a metal-saw, the combination with a swinging frame, of a rotary saw mounted therein, a support for the article, a pair of screws on which said support is mounted, and a pair of internally-threaded intermeshing gears surrounding said screws.

In testimony whereof I, the said PETER C. PATTERSON, have hereunto set my hand.

PETER C. PATTERSON.

Witnesses:
ROBERT C. TOTTEN,
ROBT. D. TOTTEN.